US006262788B1

(12) United States Patent
Hanrahan et al.

(10) Patent No.: US 6,262,788 B1
(45) Date of Patent: Jul. 17, 2001

(54) PROCESS FOR PREPARING AN OPTICAL RETARDATION FILM

(75) Inventors: Keith Hanrahan, Manchester; John Scott, Cheshire; Mark Goulding, Poole; Mark Andrew Verrall; David Coates, both of Dorset; Nicolas Sharples, Poole, all of (GB); Jun Nakanowatari, Kanagawa-ken (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/364,128

(22) Filed: Jul. 30, 1999

(30) Foreign Application Priority Data

Jul. 31, 1998 (EP) .................................................. 98114389

(51) Int. Cl.[7] ................................................. G02F 1/1333
(52) U.S. Cl. ............................ 349/117; 379/124; 379/126
(58) Field of Search ..................................... 349/117, 126, 349/124

(56) References Cited

U.S. PATENT DOCUMENTS 5,668,615 * 9/1997 Miyata .................................. 349/126

FOREIGN PATENT DOCUMENTS

WO 98/04651 2/1998 (WO).
WO 98/12584 3/1998 (WO).

* cited by examiner

Primary Examiner—James A. Dudek
(74) Attorney, Agent, or Firm—Millen White Zelano & Branigan

(57) ABSTRACT

The invention relates to a process for preparing an optical retardation film comprising at least one layer of an anisotropic polymer material, to a method of rubbing a substrate for the alignment of liquid crystal or mesogenic material that can be used in the above process, to an optical retardation film obtainable by the above process, to the use of such an optical retardation film in a liquid crystal display, and to a liquid crystal display device comprising a liquid crystal cell and such an optical retardation film.

24 Claims, 6 Drawing Sheets

PROCESS FOR PREPARING AN OPTICAL RETARDATION FILM

The invention relates to a process for preparing an optical retardation film comprising at least one layer of an anisotropic polymer material, characterized in that said process comprises the following steps A) rubbing a continuously moving substrate with at least one rubbing roller, B) coating a layer of a polymerizable mesogenic material, a liquid crystal polymer or a liquid crystal oligomer onto the rubbed surface of said substrate, C) optionally polymerizing and/or crosslinking the coated material of step B) by exposure to heat or actinic radiation, D) optionally repeating steps B) and C) at least one more time, and E) optionally removing the polymer film from the substrate.

The invention further relates to a method of rubbing a substrate for the alignment of liquid crystal or mesogenic material that can be used in the above process. The invention also relates to an optical retardation film obtainable by the above process, to the use of such an optical retardation film in a liquid crystal display, and to a liquid crystal display device comprising a liquid crystal cell and such an optical retardation film.

Upon further study of the specification and appended claims, further objects and advantages of this invention will become apparent to those skilled in the art.

Figure 1A:
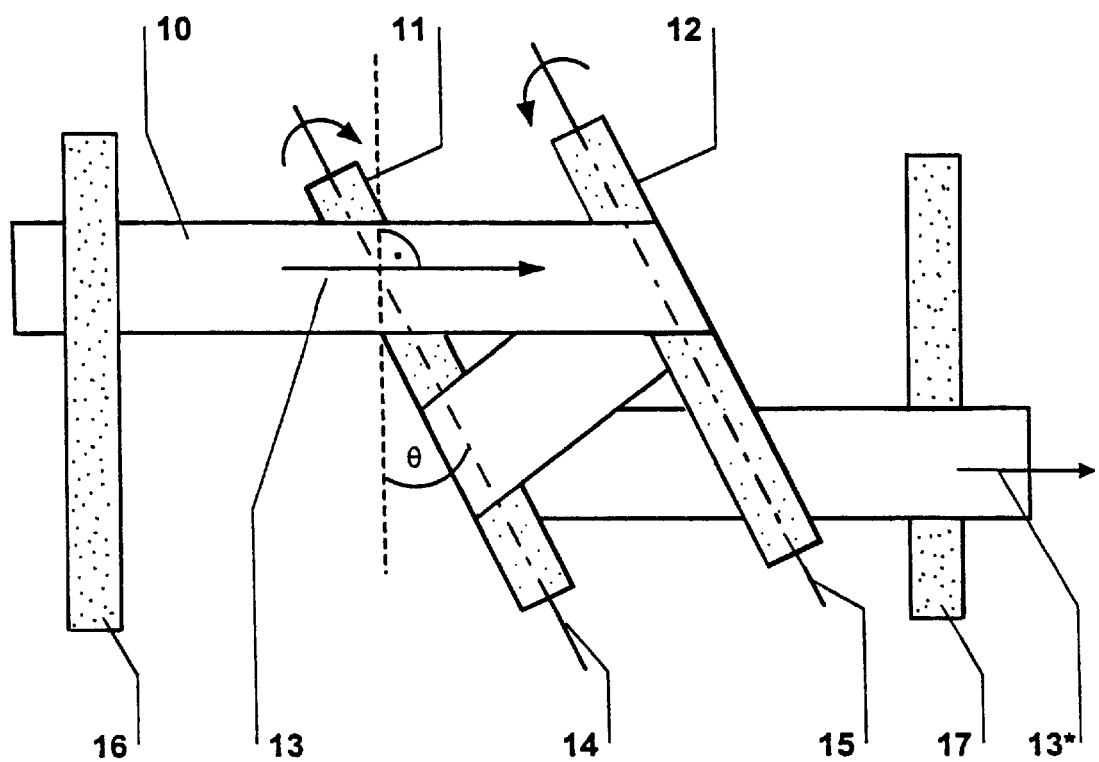
FIG. 1 depicts the rubbing method and rubbing apparatus according to a first preferred embodiment of the present invention, with FIG. 1A showing the top view and FIG. 1B showing the side view for a rub angle of 0 degrees.

In the above Figures, identical identification numbers indicate identical items or items with identical function.

BACKGROUND OF THE INVENTION

Optical retardation films comprising anisotropic polymer material with uniform orientation—like for example an oriented liquid crystal polymer—can be used as compensation films for liquid crystal displays, in order to compensate a deterioration of the optical properties of the display at large viewing angles, such as a color shift or a decrease of the contrast ratio. They can also be used for example as quarter wave retardation films (QWF) in order to transform circularly polarized light into linear or elliptically polarized light or vice versa.

Uniform orientation of a liquid crystal material is typically achieved by coating the material onto a substrate that is covered by an alignment layer, the surface of which may additionally have been rubbed in one direction. The surface material and the rubbing of the surface induce spontaneous uniform orientation of the liquid crystal material. Depending on the type of material of the alignment layer various orientations can be achieved.

An overview of techniques and materials for aligning liquid crystals is given e.g. in J. Cognard, Mol. Cryst.Liq.Cryst. 78, Supplement 1, 1–77 (1981) and in J. A. Castellano, Mol.Cryst.Liq.Cryst. 94, 33–41 (1983).

Various methods for rubbing a substrate are known. For example, rubbing can be carried out by means of a rubbing roller.

It is also possible to induce orientation of a liquid crystal material by using a substrate the surface of which has been rubbed directly, i.e. without applying an alignment layer. For example, the International Application WO 98/04651-A discloses an optical retardation film that can be used as a QWF in a display and comprises a layer of polymerized mesogenic material with uniform planar orientation, i.e. with its major optical axis being oriented substantially parallel to the film plane. WO 98/04651-A further discloses a method of preparing such an optical retardation film, according to which a polymerizable mesogenic material is coated onto a substrate that has been rubbed directly and that causes planar alignment of the mesogenic material, followed by curing the polymerizable material e.g. by exposure to heat or UV radiation.

WO 98/12584-A discloses an optical compensation film for a display and a process of its preparation, wherein the compensation film comprises a layer of polymerized mesogenic material with splayed orientation, i.e. with its major optical axis being tilted at an angle to the normal of the film and the tilt angle varying in vertical direction to the film plane. The process of preparing the compensation film described in the WO 98/12584-A also implies the use of a substrate the surface of which has been rubbed directly to induce or improve alignment of the mesogenic material.

There are also applications, like for example liquid crystal displays of the TN (twisted nematic) or STN (super twisted nematic) type, where an optical retardation film with planar orientation as described in WO 98/04651-A is preferably used in combination with a linear polarizer, with the optical retardation film and the linear polarizer being located such that their major optical axes are in planes parallel to each other and are inclined at an angle relative to each other.

For this purpose, e.g. a long roll of a retardation film with planar orientation as described in WO 98/04651-A can be prepared. The retardation film is then cut at an angle into small sheets and laminated to the linear polarizer, with the cutting angle being identical to the above mentioned inclination angle of the optical axes of polarizer and retardation film.

SUMMARY OF THE INVENTION

A less time- and material-consuming method would be the preparation of a long roll of a retardation film having planar orientation, wherein the optical axis already exhibits the desired angle of inclination relative to the film length. This retardation film could then be directly laminated roll to roll to the linear polarizer, and afterwards the laminated films could be cut into sheets of the desired size.

Thus, it is desirable to have available a method which allows the mass production of optical retardation films, like for example long rolls of film, with variable optical symmetry, especially with planar, inclined, tilted or splayed orientation as described above. The method should preferably comprise the steps of rubbing a long film substrate and preparing the optical film on the rubbed substrate in a single, continuous process.

Throughout this application, the terms "optical axis" or "major optical axis" are used to describe the optical symmetry of mesogenic or liquid crystalline materials and optical retardation films comprising them. According to the convention, in an optically uniaxial positive nematic liquid crystal material with calamitic (rod-shaped) molecules and uniform molecular orientation, the major optical axis is given by the average preferred orientation direction of the long axes of the liquid crystal molecules, whereas in case of an optical uniaxially negative nematic liquid crystal material the major optical axis is given by the orientation direction of one of the short axes of the liquid crystal molecules.

In the foregoing and the following, for sake of simplicity the invention is described, unless stated otherwise, by example to mesogenic or liquid crystalline materials that are calamitic and optically uniaxial positive. However, the present invention is not restricted to such materials. It is also possible to use e.g. liquid crystal materials that are optically uniaxial negative or biaxial, or comprise e.g. discotic (disk-shaped) molecules alternatively or in addition to calamitic molecules. The remarks given above and below about optical symmetry, its relation to molecular orientation and its dependence on specific parameters of the inventive process apply in analogy to these materials as well.

A retardation film with planar orientation and an optical axis inclined to the film length and width can be prepared for example by coating a liquid crystal material onto a film substrate that has been rubbed at an angle different from 0 degrees to its long side. This method is also commonly called off-axis rubbing and is well-known in the art. Thereby, it is possible to achieve alignment of the liquid crystal molecules with their long molecular axes inclined at an angle to the long side of the film, wherein said angle of inclination of the liquid crystal molecules and the angle at which the substrate has been rubbed are approximately the same.

A typical method of off-axis rubbing is carried out by moving a substrate across a rotating rubbing roller, wherein the rotation axis of the rubbing roller is inclined at an angle, the so-called rub angle, to the moving direction of the substrate. By varying the rub angle, it is possible to alter the orientation of the liquid crystal material coated onto said substrate.

Off-axis rubbing of a substrate for aligning liquid crystal materials by means of a rubbing roller is described for example in the patent applications JP 06-110059-A, JP 07-191322-A and JP 08-160429-A.

However, the methods of off-axis rubbing as described in prior art bear several disadvantages. Thus, due to the exertion of a rubbing force in an oblique direction to the moving substrate, an unwanted side-drift and a friction of the substrate often occur, which may even lead to the formation of wrinkles in the film substrate. This negatively affects the quality and uniformity of alignment of the liquid crystal material to be coated on the substrate.

Furthermore, the methods as described in the above documents require the application of an alignment layer, such as polyimide, other organic polymer materials or evaporated SiO, to the substrate before being coated with the liquid crystal material. On the other hand, these documents do not give a hint to a method of achieving uniform alignment by directly rubbing the film substrate.

Thus, there is still a need for a method of off-axis rubbing of a substrate that can be used for the alignment of a liquid crystal material, wherein said method allows direct and easy control of the process parameters such as the rub angle and the rub length, and avoids the drawbacks of known methods as mentioned above.

Furthermore, there is a need for a process of preparing an optical retardation film comprising a liquid crystal material with uniform orientation of high quality in a simple manner, wherein this process is also suitable for mass production and allows to prepare retardation films with different types of optical geometry, in particular with planar, tilted and splayed orientation, and wherein easy and direct control of the orientation of the liquid crystal molecules, especially of the angle of inclination of their long molecular axis, is possible.

One of the aims of the present invention is to provide a method of off-axis rubbing of a substrate which can be used for the above mentioned purposes. Another aim is to provide a process of preparing an optical retardation film fulfilling the above mentioned requirements. Other aims of the present invention are immediately evident to the skilled in the art from the following detailed description.

It has been found that these aims can be achieved with a process of preparing an optical retardation film according to the present invention.

One object of the present invention is a process for preparing an optical retardation film comprising at least one layer of an anisotropic polymer material, characterized in that said process comprises the following steps A) rubbing a continuously moving substrate with at least one rubbing roller, by continuously moving it is meant that the substrate is constantly moved in one direction during the step and, preferably, at constant speed, B) coating a layer of a polymerizable mesogenic material, a liquid crystal poymer or a liquid crystal oligomer onto the rubbed surface of said substrate, C) optionally polymerizing and/or crosslinking the coated material of step B) by exposure to heat or actinic radiation, D) optionally repeating steps B) and C) at least one more time, and E) optionally removing the polymer film from the substrate.

Another object of the present Invention relates to a method of rubbing a substrate for aligning liquid crystal material coated onto said substrate. This rubbing method is preferably used in step A) of the above mentioned process for preparing an optical retardation film.

Another object of the present invention is an optical retardation film obtainable by the above mentioned process. A further object of the present invention is the use of such an optical retardation film in a liquid crystal display. Another object of the present invention is a liquid crystal display device comprising a liquid crystal cell and such an optical retardation film. Yet another object is an apparatus that is used for the inventive method of rubbing.

Figure 1B:
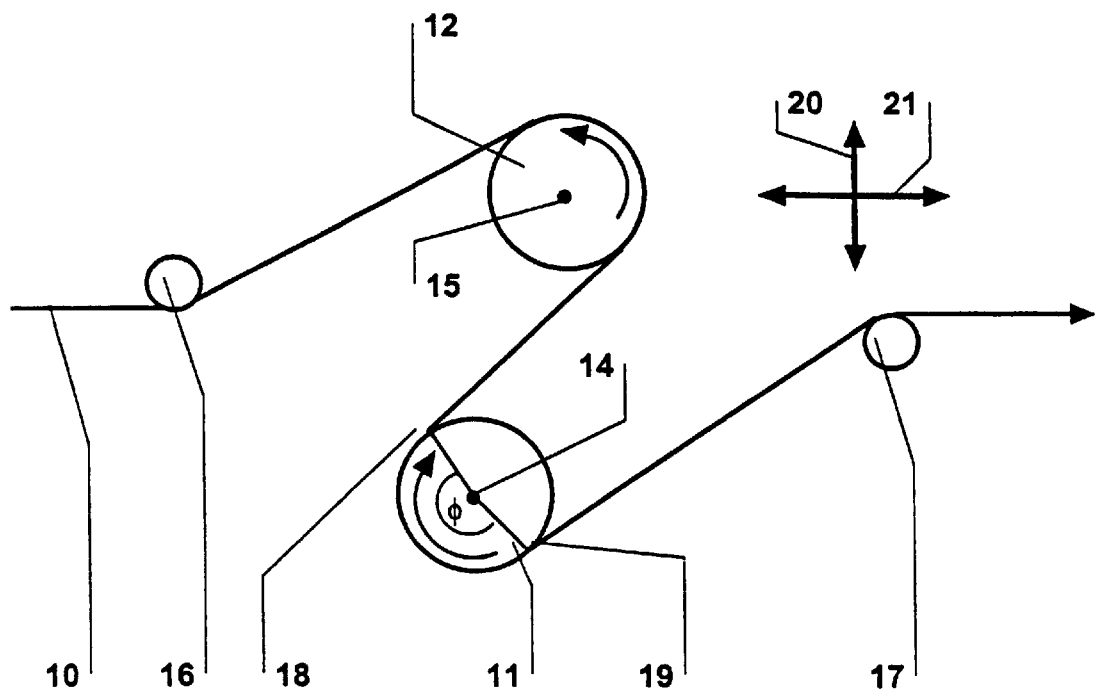

FIG. 1 exemplifies a method of rubbing a substrate with a rubbing roller according to a first preferred embodiment of the present invention, with FIG. 1A showing the plan view and FIG. 1B showing the cross section for a rub angle of 0 degrees.

According to this preferred embodiment, rubbing is carried out by continuously, moving a substrate 10 into the direction 13;13* between at least two rollers 11 and 12, at least one of which is giving rubbing treatment to the substrate, wherein a) said at least two rollers 11 and 12 are located on opposite sides of the substrate 10,
b) said at least two rollers 11 and 12 are rotating against the moving direction 13;13* of the substrate 10,
c) said at least one of said at least two rollers 11 and 12, e.g. roller 11, giving rubbing treatment to the substrate 10 is located such that its rotation axis 14 and the normal to the moving direction 13 of the substrate form an angle θ (rub angle, see FIG. 1A) that can be varied within the range from 0 to less than 90 degrees,
d) said at least one of said at least two rollers 11 and 12, e.g. roller 11, giving rubbing treatment to the substrate 10 is located such that the substrate is wrapped at least partially around the roller at a wrap angle φ that can be varied within the range from 0 to at least 270 degrees; with said wrap angle φ being defined as the angle of the circular segment of the cross section of the roller that is in contact with the moving substrate 10 (see FIG. 1B).

In the inventive method of rubbing as depicted in FIGS. 1A and 1B, the rotation axes 14;15 of the rollers 11;12 are parallel to each other and parallel to the substrate planes shown. The moving directions of the substrate before 13 and after 13* contacting the rollers 11; 12 are thus also substantially parallel to each other.

The substrate can be drawn through the rubbing and compensation roller 11;12 e.g. by a wind up roller that is located downstream of the rollers 11; 12 and is operated by a constant speed motor (not shown in FIG. 1). The moving speed and tension of the substrate can thus be controlled by the rotation speed of the wind up roller.

If the rub angle θ in the inventive process is altered to be different from 0 degrees, the lateral position of the wind up roller consequently has to be adjusted to allow for the change of the substrate position (as indicated by the different lateral positions of arrows 13 and 13* in FIG. 1A). Thus, in this case the wind up roller is not exactly in line with the roll from which the substrate is being unwound.

Optionally further rollers can be used to control the moving direction, speed and tension of the substrate. Thus, before and after contacting the rubbing roller 11 and the compensation roller 12, the moving substrate is preferably held in its moving direction 13;13* by further guide rollers 16 and 17.

In the inventive rubbing method as described in the foregoing and the following, at least one one of the rubbing rollers is contributing to the rubbing required for aligning the liquid crystal material, whereas at least one other of the rubbing rollers is a counter roller which acts to prevent the substrate from drifting.

In this connection, the term "rubbing roller" denotes a roller that is located on the side of the substrate which subsequently is coated with the liquid crystal material, whereas the term "compensation roller" is used for a counter roller located on the opposite side of the substrate.

The terms "rub angle", "rub length", "wrap angle" etc. as used in the foregoing and the following refer to the rubbing rollers.

For the sake of simplicity, in the following explanation of the inventive method, which is also illustrated by FIGS. 1 to 4, roller 11 is being referred to as the "rubbing roller", whereas roller 12 is being referred to as the "compensation roller". It should be noted, however, that the two rollers 11 and 12 are also interchangeable with each other with respect to their function, e.g. by inverting the moving direction of the substrate or by using the opposite side of the substrate for the coating with LC material.

The inventive method of rubbing is characterized in that the rub angle, which is defined as the angle between the rotation axis of the rubbing roller 11 and the normal to the direction of the moving substrate 13;13*, can be varied from 0 to less than 90 degrees. This can be easily achieved for example by turning the rubbing roller 11 around the centre of its rotation axis 14 in a plane parallel to the plane of the substrate 10.

The inventive method is further characterized in that the substrate is wrapped at least partially around the rubbing roller and preferably also around the compensation roller. The term "wrapped at least partially around a roller" herein means that the substrate is moved over the roller in such a way that a definite surface area of the substrate is in contact with the roller.

The extent to which the substrate is wrapped around the rubbing roller is given by the wrap angle φ. This is exemplarily illustrated in FIG. 1B, wherein the wrap angle φ is the angle formed by the two radii at the tangential positions 18 and 19 between which the rubbing roller 11 is in contact with the substrate 10.

For example, a wrap angle of 0 degrees means that the substrate 10 is moved across the rubbing roller 11 without changing its direction, whereas for example a wrap angle of 180 degrees means that the substrate performs a U-turn when being moved across the rubbing roller 11.

In the first preferred embodiment as shown in FIG. 1B, the wrap angle φ and thereby the rub length can easily be varied for example by a translational shift of the rotation axis 14 of the rubbing roller 11 and/or the rotation axis 15 of the compensation roller 12 in vertical 20 and/or horizontal 21 direction as depicted by the respective arrows.

Figure 2:
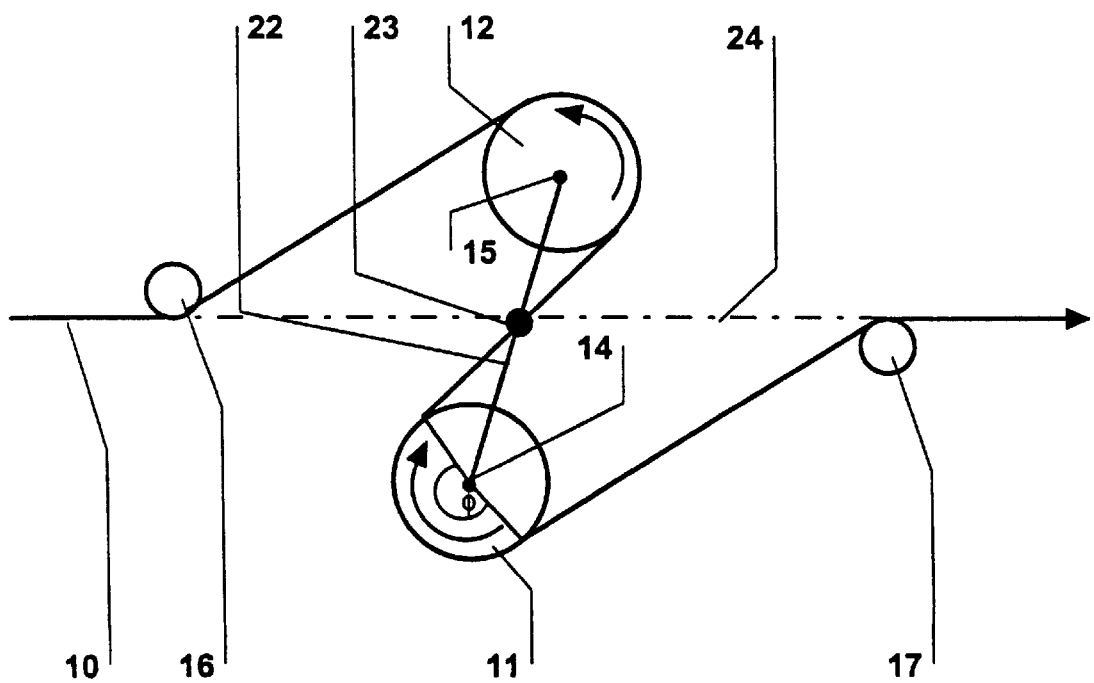
FIG. 2 shows the rubbing method and rubbing apparatus according to a second preferred embodiment of the present invention in side view for a rub angle of 0 degrees.

FIG. 2 shows a rubbing method according to a second preferred embodiment of the present invention, wherein the rotation axes 14;15 of the two rollers 11;12 are connected by at least one linking element 22 to form a unit. Thus, the wrap angle φ and thereby the rub length can easily be varied by turning the connected rollers 11 and 12 around an axis 23 parallel to their rotation axes 14;15.

In this preferred embodiment, particularly preferably the diameters the rollers 11 and 12 are identical, and the axis 23 is in the center between the two rotation axes 14 and 15, as depicted in FIG. 2.

Further preferably the axis 23 is in the plane 24 of the tangential lines at which the substrate meets the guide roller 16 and at which the substrate leaves the guide roller 17.

Figure 3:
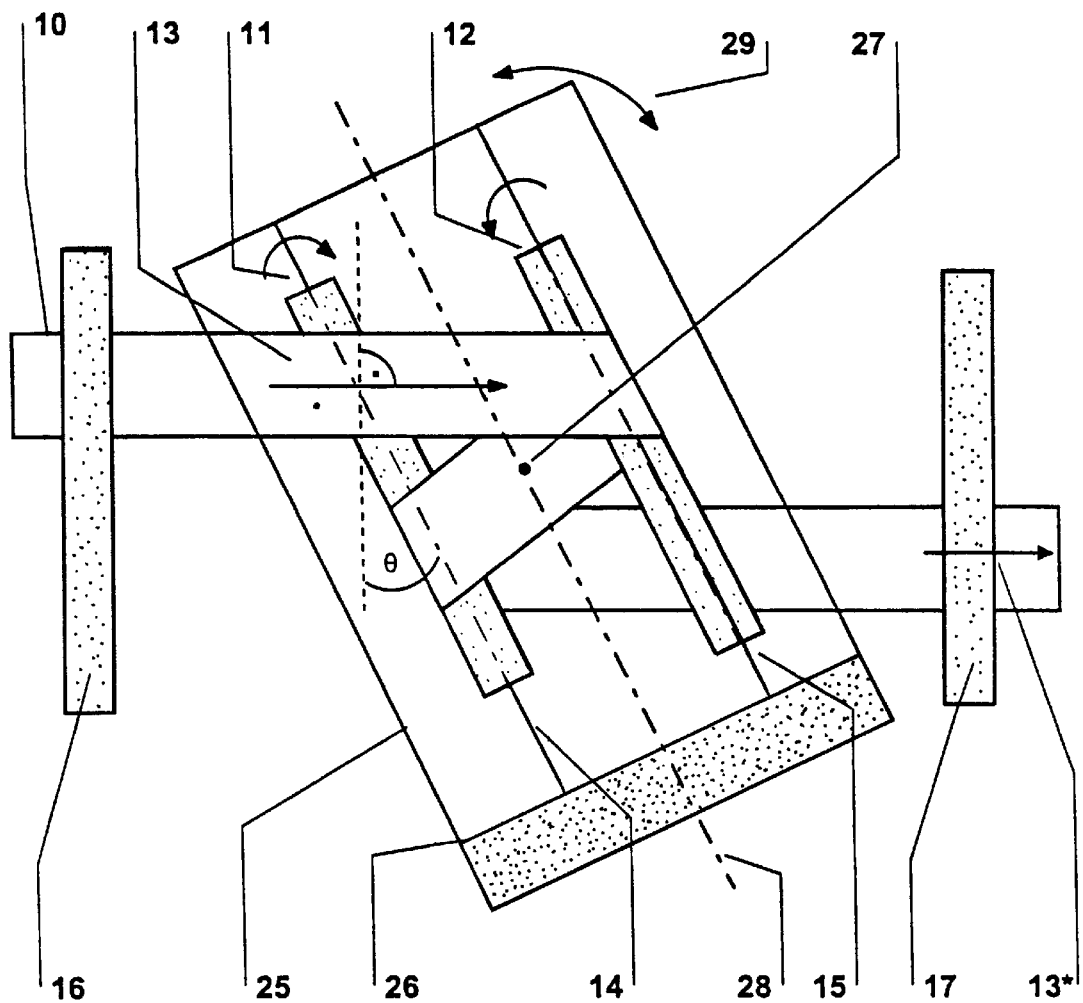
FIG. 3 is a top view of the rubbing method and rubbing apparatus according to a third preferred embodiment of the present invention.

FIG. 3 shows an apparatus for rubbing a substrate according to a third preferred embodiment of the present invention. Therein, the rubbing roller 11 and the compensation roller 12 form a rotatable unit 25 that further comprises a driving means 26 comprising one or more motors and optionally gears giving rotation speed of equal absolute value and opposite sense to the rollers 11;12. Therein, unit 25 is rotatable around two axes 27 and 28.

In the apparatus shown in FIG. 3, the rub angle θ can easily be varied by rotating the unit 25 clockwise or counterclockwise into the directions shown by the arrow 29 around the axis 27 that is perpendicular to the plane defined by rollers 16 and 17, whereas the wrap angle φ can be varied by rotating the unit around the axis 28 that is parallel to the rotation axes 14;15 of the rollers 11;12.

Figure 4:
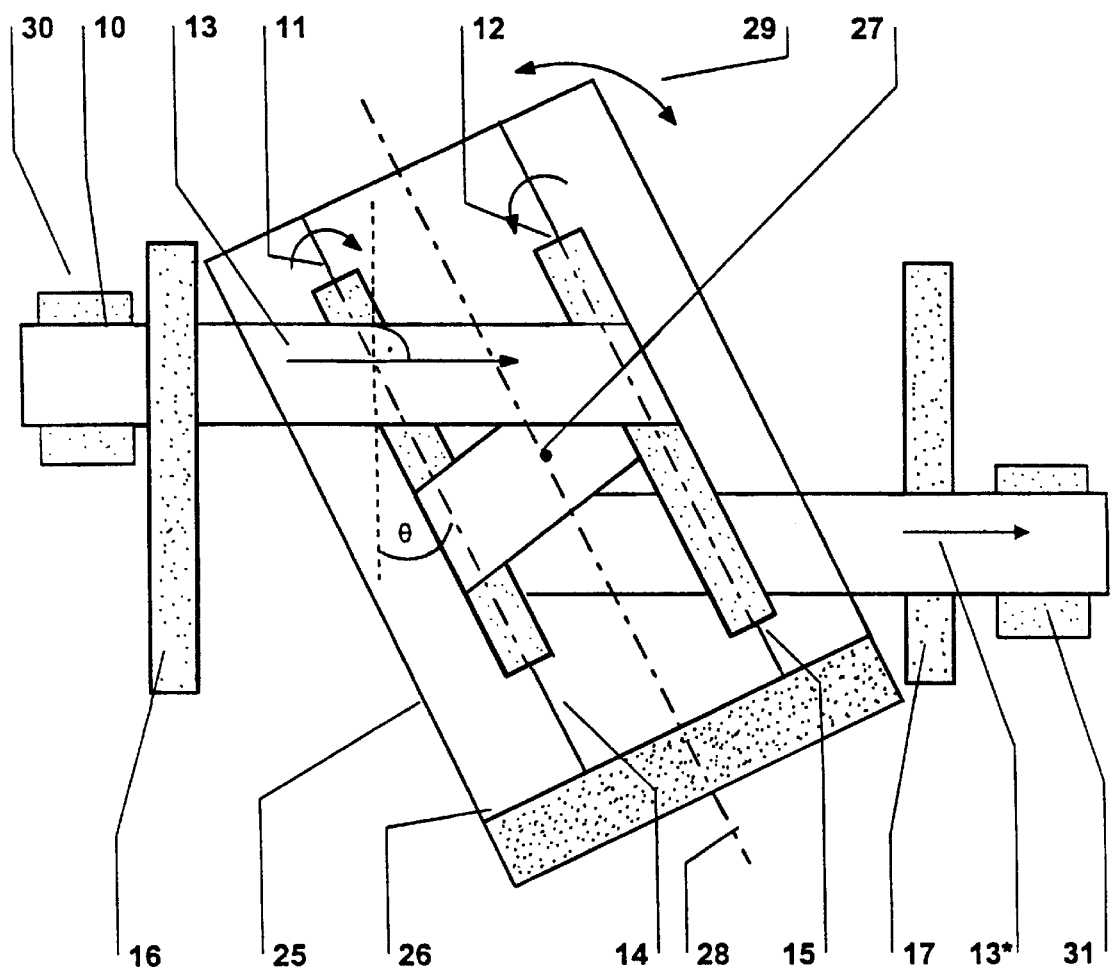
FIG. 4 is a top view of the rubbing method and a rubbing apparatus according to a fourth preferred embodiment of the present invention.

FIG. 4 shows an apparatus for rubbing a substrate according to a fourth preferred embodiment of the present invention, which comprises a unit 25 with a rubbing roller 11 and a compensation roller 12, a driving means 26 comprising one or more motors and optionally gears for rotating the rollers, and further comprises two vacuum beds 30 and 31 over which the substrate is moved before and after being rubbed.

The vacuum beds act as a support to the moving substrate 10 that stabilizes the substrate in its moving direction 13;13* and in addition to the compensation roller suppresses or, in the ideal case, avoids a possible side shift of the substrate 10 from its moving direction 13;13* that may eventually be caused for example by a difference in friction of the moving rollers 11;12 on the substrate, e.g. due to a speed difference between the rollers.

Vacuum beds are used in prior art e.g. to hold a film or sheet substrate in a fixed place or fixed moving direction and are known to the expert in the field. In a typical embodiment they consist of a metal box having a top plate with a plurality of holes onto which the substrate is placed, or across which the substrate is moved, and a means to reduce the pressure inside the box. (This reduction of pressure is also commonly called "application of a vacuum").

When vacuum is applied, air is pressed by the ambient pressure through the holes into the box, and the friction between the substrate and the moving air thus created causes the substrate drawn across the top plate to be held in its moving direction without a significant lateral shift.

In some cases, particularly in the case of short rub lengths, a carefully adjusted gearing of the rollers by one motor may already be sufficient to suppress a potential difference in speed and/or friction between the rollers and thereby to prevent a side shift of the substrate, thus vacuum beds are not necessarily required in all cases and under all conditions.

In another preferred embodiment, only one vacuum bed is used, over which the substrate is moved either before being rubbed (bed 30) or after having been rubbed (bed 31).

The rubbing roller 11 and optionally also the compensation roller 12 are preferably covered with a rubbing cloth. As mentioned above, however, usually only the rubbing roller contributes to the rubbing required, whereas the compensation roller is a counter roller which mainly acts to prevent the substrate from drifting.

In the inventive rubbing method, preferably both the rubbing roller 11 and the compensation roller 12 are covered with a rubbing cloth. Thus, the compensation roller is also rubbing the substrate on the opposite side, which in turn ensures that the friction is equal on both sides of the substrate.

In case both sides of the substrate are rubbed, either side of the substrate can be used for the alignment of a liquid crystal material being coated thereon. Thus, if for example in the method as depicted in FIG. 1 both rollers 11 and 12 are covered with a rubbing cloth, both sides of the substrate 10 can be coated with liquid crystal material, e.g. subsequently one after another. In this case, the guide roller 17 is preferably omitted, in order not to negatively affect the alignment properties of the surface of the substrate that was rubbed by the roller 12.

As mentioned above, in addition to its function of rubbing the substrate, the rubbing cloth also reduces the friction of the substrate wrapped around the roller. The rubbing cloth is preferably selected such that in the ideal case it gives point contact to the substrate, with the substrate floating on the points.

The term "point contact" in this connection has the following meaning: When considering e.g. a velvet cloth used as rubbing cloth, this has a pile, i.e. it has many strands of cotton with uniform length that are attached to a base. When the film substrate in the inventive rubbing method comes in contact with these strands, e.g. if the distance from the base of the velvet to the film substrate is reduced to a value less than the length of the pile, each individual strand effects the film in the same way. The ideal structure in this case would be that all strands slightly touch the film substrate, thus giving point contact to the substrate. However, in practice this normally does not occur due the pressure put on the base to keep it taut.

In the inventive rubbing method according to this preferred embodiment the rollers 11;12 are started to rotate before the substrate 10 is started to move. Thereby, an air cushion is produced, and the substrate is caused to float on top of the rubbing cloth, which reduces especially the initial friction of the substrate when contacting the rollers.

In a particularly preferred embodiment, air is pumped from inside of the rollers 11;12 through small holes in the mantle surface of the rollers, in order to aid the formation of an air cushion as described above during the start of the rubbing process. After the rollers have started, the air pressure is typically reduced to aid control of the floating of the substrate and thereby to aid control of the rubbing friction.

The above mentioned method to form an air cushion is particularly useful when film substrates are used that are sensitive to stress and/or friction, and especially when large wrap angles are applied.

As rubbing cloth all conventional materials can be used. For example velvet of a commercially available standard type can be used as a rubbing cloth.

The alignment properties of the substrate for a mesogenic or liquid crystal material coated on the rubbed substrate can be controlled by adjusting the process parameters of the inventive rubbing process, such as the rub angle $\theta$, wrap angle $\phi$, rub length, rubbing pressure, rubbing depth, the rotation velocity and diameter of the rubbing roller and compensation roller and the tension on the substrate.

Figure 5:
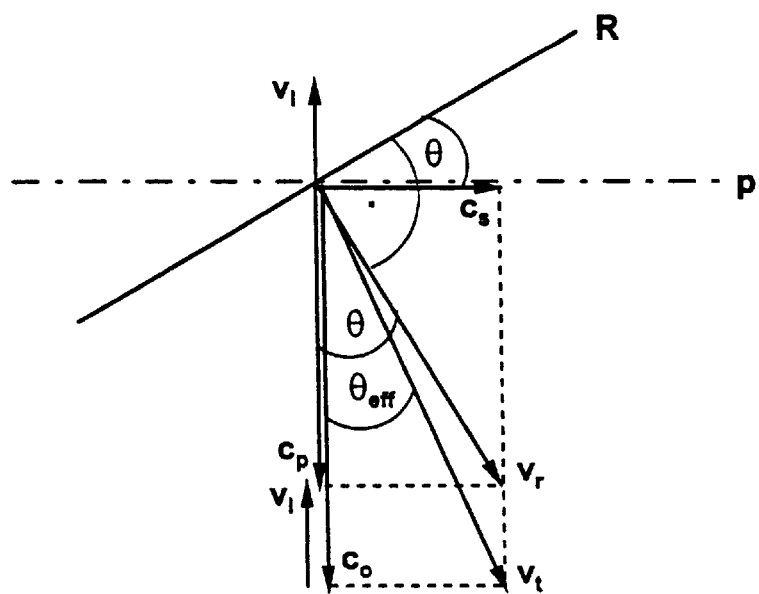
FIG. 5 illustrates the calculation of the effective rub angle in a rubbing method according to the present invention.

The relationship between some relevant parameters of the inventive rubbing process is schematically depicted in FIG. 5 and exemplarily described below.

In FIG. 5, $v_1$ denotes the direction and constant speed of a moving substrate, R denotes the axis of a rubbing roller located at the rub angle $\theta$ relative to the direction p perpendicular to the moving direction of the substrate in the plane of the substrate, wherein said rubbing roller has the diameter d (not shown) and rotates at the constant speed $v_{rol}$ given in rounds per time (not shown).

The rubbing speed $v_r$ can be calculated from the diameter d and the rotation speed $v_{rol}$ of the rubbing roller according to the following equation $$v_r = \pi \cdot d \cdot v_{rol}$$

The rubbing speed $v_r$ can be separated into a component $c_\parallel$ parallel and a component $c_\perp$ perpendicular to the substrate direction $v_f$, with $$c_\parallel = v_r \cdot \cos\theta$$

and $$c_\perp = v_r \cdot \sin\theta$$

The observed component $c_o$ of the rubbing speed parallel to the substrate direction is then given as $c_o = c_\parallel - v_f$, wherein the values of $c_o$ and $c_\parallel$ are opposite in sign to $v_f$, since the rubbing roller rotates against the direction of the moving substrate.

The total rubbing speed $v_t$ observed by the substrate is then given by $$v_t = (c_o^2 + c_\perp^2)^{1/2}$$

and the angle $\theta_{\it eff}$ of observed rub relative to the substrate direction given by $$\theta_{\it eff} = \arcsin(c_\perp / v_t).$$

The angle θeff in the following is also called the effective rub angle.

The rub length I is directly proportional to the wrap angle φ, the diameter d of the rubbing roller and the rotation speed of the rubbing roller, and inversely proportional to the forward speed of the substrate.

The rub length can be calculated from the total rub speed $v_t$ and the wrap angle φ as follows: The time t of contact between the web and the rubbing roller (contact time) is given by the following equation $$t = (\pi \cdot d \cdot \phi / 360) / v_f$$

The total rub length $I_t$ is then given by $I_t = v_t \cdot t$.

The preferred ranges of values for the process parameters such as the rub angle, wrap angle, rubbing pressure, rubbing depth, speed and size of the rubbing and compensation rollers, and speed of the moving web can be easily selected and adjusted by the expert to achieve the desired effective rub angle and rub length, and thereby to control the orientation of the liquid crystal molecules coated onto the substrate.

The rub angle θ in the inventive method is preferably from 0 to 75 degrees, in particular from 1 to 60 degrees, very preferably from 3 to 45 degrees.

The wrap angle φ in the inventive rubbing method is preferably from 0 to 270, especially from 0 to 180, very preferably from 0 to 120 degrees.

The wrap angle φ in the inventive rubbing method can be varied from 0 up to almost 270 degrees if the diameter of the rubbing roller 11 is equal to or smaller than the diameter of the compensation roller 12, as obvious from FIGS. 1 and 2.

Figure 6:
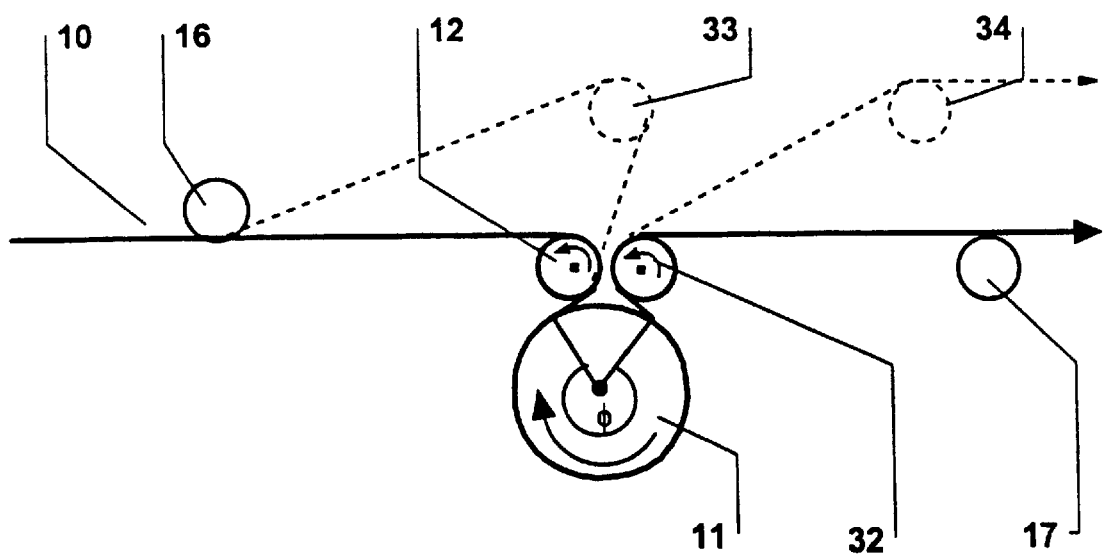
FIG. 6 shows the rubbing method and rubbing apparatus according to a further preferred embodiment of the present invention in side view for a rub angle of 0 degrees.

FIG. 6 depicts another preferred embodiment of the present invention. As shown therein, the wrap angle φ can be increased beyond values of 270 degrees up to almost 360 degrees, if two compensation rollers 12 and 32 are used whose diameters are smaller than that of the rubbing roller 11. In this case, further guide rollers 33;34 can be used in addition to roller 16.

In this case, the relevant rubbing properties of both compensation rollers 12 and 32, like the diameter, rotation speed, rubbing pressure, surface material etc., have to be adjusted so that in total they compensate the respective parameters of the rubbing roller 11, in order to prevent a side drift of the substrate.

In the embodiment shown in FIG. 6, it is also possible to use the surface of the substrate 10 that has been rubbed by the compensation rollers 12;32 for the coating with LC material (i.e. roller 11 and rollers 12;32 are interchanged with respect to their function). In this case, the rollers 17 and 34 are omitted or transferred to the other side of the substrate. The total wrap angle observed by the substrate is then given by the sum of the wrap angles of each of the rollers 12 and 32. Thus, it is possible to achieve an effective wrap angle of more than 360 degrees.

Accordingly, the wrap angle and thus the rub length can further be increased by using further rollers that rub the substrate in addition to rollers 11, 12 and 32.

Furthermore, it is possible to alter the wrap angle and rub length by using additional guide rollers 33;34.

The above described ways of increasing the wrap angle φ and rub length I by using additional rubbing rollers and/or guide rollers are not limited to the embodiment shown in FIG. 6. They can generally be applied to the method of rubbing according to the present invention, in particular to the first, second, third and fourth preferred embodiments as described above.

The machines used for rubbing the substrate according to the preferred embodiments as described above and below and as shown in FIGS. 1, 2, 3, 4 and 6 are another object of the present invention.

Thus, one further object of the present invention is a rubbing apparatus comprising at least two rollers 11 and 12, at least one of which is giving rubbing treatment to a substrate 10 that is moved between said at least two rollers 11;12, and optionally comprising one or more guide rollers 16;17, wherein the position of said rollers and the conditions of said rubbing treatment are as described for the first preferred embodiment above.

Another object of the present invention is an apparatus as described above, wherein the rotation axes 14;15 of said at least two rollers 11;12 are connected by at least one linking element 22, and wherein the rollers 11;12 are rotatable around an axis 23 parallel to their rotation axes 14;15.

Another object of the present invention is an apparatus as described above, wherein the rollers 11 and 12 form a rotatable unit 25 that further comprises a driving means 26 comprising one or more motors and optionally gears giving rotation speed of equal absolute value and opposite sense to the rollers 11;12, and wherein unit 25 is rotatable around the two axes 27 and 28 as described for the fourth preferred embodiment above.

Another object of the present invention is an apparatus as described above that is further comprising one or more vacuum beds 30;31 over which the substrate 10 is moved before and/or after being rubbed.

Another object of the present invention is an apparatus as described above that is comprising at least three rollers 11;12;32 giving rubbing treatment to the substrate 10, at least two of which are located on opposite sides of the substrate 10.

As substrate all flexible film substrates can be used that are known to the expert for this purpose. Preferably the substrate is a flexible plastic film, such as for example a film of polyethyleneterephthalate (PET), polyvinylalcohol (PVA), polycarbonate (PC) or triacetyl-cellulose (TAC), especially preferably a PET film or a TAC film. PET films are commercially available for example from ICI Corp. under the trade name Melinex. The above given examples of film materials should, however, only explain but not restrict the present invention.

Isotropic or birefringent substrates can be used. In case the substrate is not removed from the coated film, preferably isotropic substrates are used. As a birefringent substrate for example an uniaxially stretched plastic film can be used.

The liquid crystal material can be coated onto the rubbed substrate after the rubbing process in a single, continuous process, e.g. on the same production line. It is further possible to laminate the optical retardation film prepared by the inventive method directly (e.g. roll to roll) to other films or layers, such as further optical film components or adhesion, protection or release films and the like.

Alternatively, the act of rubbing of the substrate and the act of coating of the liquid crystal material onto the substrate can be carried out separately, and the rubbed substrate can inbetween e.g. be stored and/or shipped.

The liquid crystal material that is used in the inventive process of preparing an optical retardation film can be selected principally from all types of liquid crystal materials known to the expert. Especially preferred materials are polymerizable mesogenic or liquid crystalline compounds or mixtures thereof, linear or crosslinked liquid crystal polymers of the side chain and/or main chain type, liquid crystal oligomers, or mixtures of these materials.

According to the inventive process, the liquid crystal material is coated on the moving substrate in form of a thin layer. This can be done by conventional techniques that are known to the expert, such as stream coating, doctor blading etc . . .

It is also possible to dissolve the liquid crystal material in a suitable solvent. This solution is then coated onto the substrate and the solvent is evaporated off.

For this purpose, for example standard organic solvents can be used, such as ketones like e.g. methyl ethyl ketone or cyclohexanone, aromatic solvents like e.g. toluene or xylene or alcohols such as e.g. methanol, ethanol or isopropyl alcohol. It is also possible to use binary, ternary or higher mixtures of the above solvents.

The coated liquid crystal material usually aligns itself spontaneously to give the desired orientation, depending on the type of substrate and the rubbing direction.

An orientation of the liquid crystal material wherein the molecules orient themselves with their long axes parallel to the moving direction of the substrate can be achieved e.g. by coating the material onto a plastic substrate that had been rubbed in a direction parallel to the moving direction of the substrate.

Figure 7:
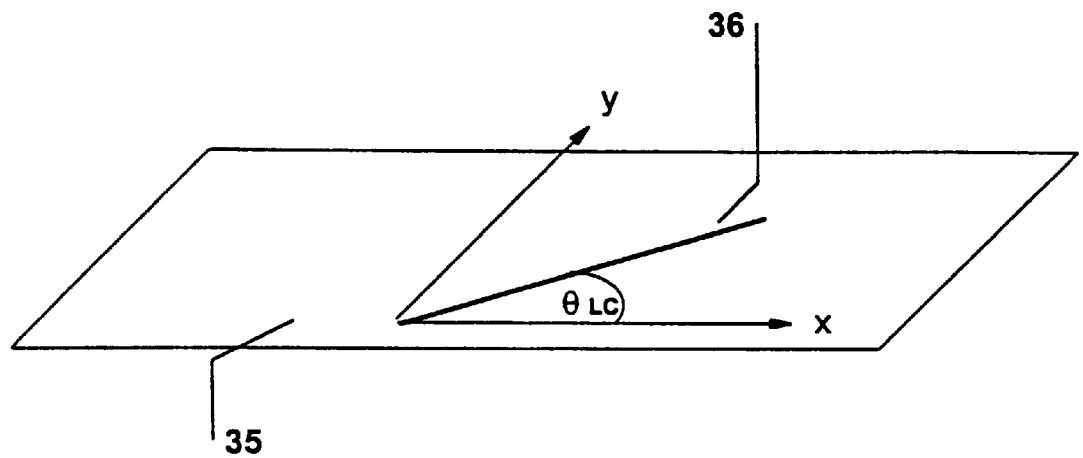
FIGS. 7 and 8 show the orientation of the optical axis in optical retardation films prepared by a process according to the invention.

An orientation of the liquid crystal material wherein the molecules orient themselves with their long axes inclined at an angle to the moving direction of the substrate can be achieved by off-axis rubbing of the substrate, as exemplarily shown in FIG. 7.

FIG. 7 schematically depicts a piece of an optical retardation film 35 that has been prepared according to a preferred embodiment of the present invention, by coating a liquid crystal material on a moving long film substrate which was previously subjected to off-axis rubbing at the rub angle θ. In FIG. 7, the x-y-plane represents the contact plane of film and substrate, and the x-axis represents both the long side and the moving direction of the substrate.

In the embodiment shown in FIG. 7, off-axis rubbing of the substrate induces an alignment in the liquid crystal material wherein the liquid crystal molecules are oriented parallel to the plane of the substrate, with the average preferred orientation direction 36 of the liquid crystal molecules being inclined at an angle $\theta_{LC}$ to the long side of the substrate. Thus, the major optical axis of the resulting retardation film is also inclined at an angle $\theta_{LC}$ to the long side of the film, wherein the value of $\theta_{LC}$ is approximately the value of the effective rub angle $\theta_{eff}$, which can be calculated from the rub angle θ as described above.

In some cases, the anchoring forces of the substrate surface are oriented such that the liquid crystal material is not oriented parallel, but tilted at an angle to the surface of the substrate. This situation is exemplarily shown in FIG. 8.

Figure 8:
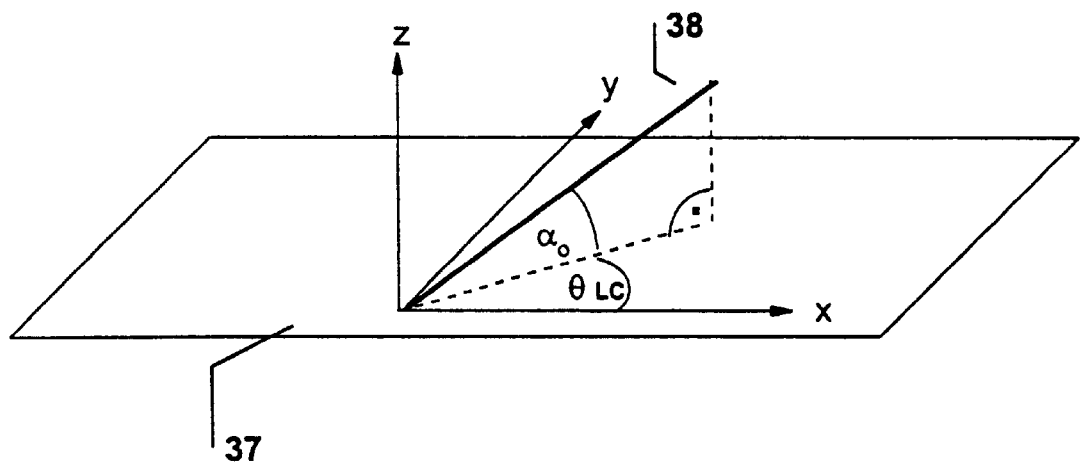

FIG. 8 schematically depicts a piece of an optical retardation film 37 that has been prepared according to another preferred embodiment of the present invention, by coating a liquid crystal material on a moving substrate which was previously subjected to off-axis rubbing at a rub angle θ. In FIG. 8, the x-y-plane represents the contact plane of film and substrate, the x-axis represents the long side and the moving direction of the substrate, and the z-axis represents the direction normal to the film plane.

In the embodiment shown in FIG. 8, the average preferred orientation direction 38 of the liquid crystal molecules, in addition to being inclined at an angle $\theta_{LC}$ to the long side of the film due to off-axis rubbing as described for FIG. 7 above, is also tilted at an angle $\alpha_o$ out of the film plane.

The tilt angle $\alpha_o$ can be altered by varying the rubbing conditions, in particular the rub length, rubbing pressure, substrate material, roller surface material and the LC material. For example, by adding a surfactant to the liquid crystal material, it is possible to reduce the tilt angle $\alpha_o$ and thereby to obtain planar alignment with almost zero tilt.

In another preferred embodiment, the substrate is coated with a layer of an organic material, preferably with polyimide, nylon or PVA, in order to change the alignment. Thereby, the tilt angle of the liquid crystal molecules relative to the film plane can be altered.

An alignment layer can also be applied in order to increase the uniformity of alignment.

Uniform alignment of the coated liquid crystal material can further be enhanced for example by shearing the material. In some cases the shear forces caused by the act of coating itself are sufficient to improve the alignment.

Suitable techniques for further treatment of the substrate surface can be found in the literature, e.g. in the publications of J. Cognard, Mol.Cryst.Liq.Cryst. 78, Supplement 1, 1–77 (1981) and J. A. Castellano, Mol.Cryst.Liq.Cryst. 94, 33–41 (1983).

Preferably, the inventive process of preparing an optical retardation film is carried out by using a substrate the surface of which has been rubbed directly, without the application of an alignment layer on top of the substrate.

Furthermore, it is possible to apply heat or an electric or magnetic field to the coated liquid crystal material to improve and/or accelerate alignment.

In particular when LC polymer materials are aligned, it is preferred to apply heat treatment ot the coated LC polymer in order to reduce the viscosity of the polymer and thereby to accelerate the formation of a uniformly aligned state.

In another preferred embodiment, the coated layer of the liquid crystal material is covered with a second substrate, wherein the shearing caused by putting together the two substrates improves the alignment.

In case of nematic liquid crystal materials, especially nematic liquid crystalline mixtures of polymerizable mesogenic compounds, however, these materials tend to align easily on a rubbed surface so that further treatment is usually not necessary.

According to a preferred embodiment of the present invention, the optical retardation film is prepared from a polymerizable mesogenic material which is coated on the rubbed substrate, where it is aligned into a uniform orientation, and subsequently cured by exposure to heat or actinic radiation in the presence of a polymerization initiator.

A detailed description of this method can be found e.g. in D. J. Broer et al., Makromol.Chem. 190, 2255 ff. (1989).

The substrate can be removed after polymerization or not. In case two substrates are used, at least one of the substrates has to be transmissive for the actinic radiation used for the polymerization.

The polymerizable mesogenic material is preferably comprising at least one polymerizable mesogenic compound having at least one polymerizable group.

The terms polymerizable mesogenic compound or polymerizable liquid crystalline compound as used in the foregoing and the following comprise compounds with a rod-shaped, board-shaped or disk-shaped mesogenic group, i.e.

a group with the ability to induce mesophase behaviour in a compound comprising said group. These compounds do not necessarily have to exhibit mesophase behaviour by themselves. It is also possible that these compounds show mesophase behaviour only in mixtures with other compounds or when the polymerizable mesogenic compounds or the mixtures comprising them are polymerized.

A preferred embodiment of the present invention relates to a process of preparing an optical retardation film, wherein the polymerizable mesogenic material comprises at least one polymerizable mesogenic compound comprising one polymerizable group, at least one polymerizable mesogenic or non-mesogenic compound comprising two or more polymerizable groups, and a polymerization initiator.

Another preferred embodiment of the present invention relates to a process of preparing an optical retardation film, wherein the polymerizable mesogenic material comprises at least two polymerizable mesogenic compounds comprising one polymerizable group, optionally one or more polymerizable non-mesogenic compounds comprising two or more polymerizable groups, and a polymerization initiator.

Suitable polymerizable mesogenic compounds and mixtures that are preferably used in the inventive process can be found in the WO 98/04651-A, WO 98/00475 and WO 98/12584-A, with the entire disclosure of these documents being incorporated into this application by way of reference.

Further typical examples of polymerizable mesogenic compounds can be found in WO 93/22397; EP 0 261 712; DE 195 04 224; DE 44 08 171 or DE 44 05 316. The compounds disclosed in these documents, however are to be regarded merely as examples that should not limit the scope of this invention.

Furthermore, typical examples of polymerizable mesogenic compounds are shown in the following list of compounds, which is, however, to be understood only as illustrative without limiting the scope of the present invention:

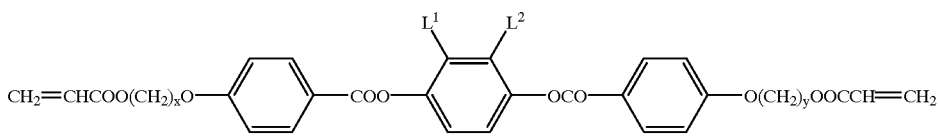
(V1)

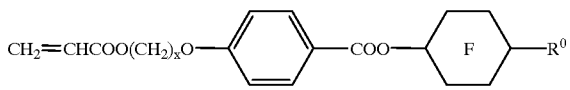
(V2)

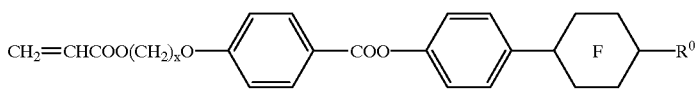
(V3)

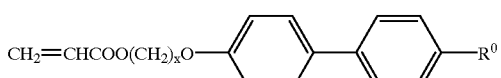
(V4)

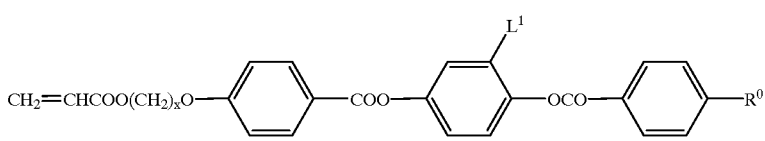
(V5)

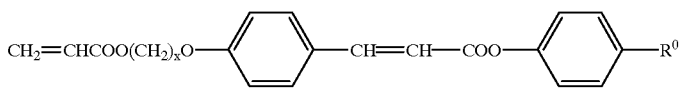
(V6)

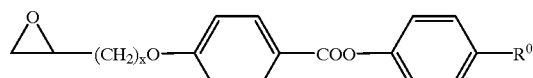
(V7)

In these compounds x and y are each independently 1 to 12, F is a 1,4-phenylene or 1,4-cyclohexylene group, $R^0$ is halogen, cyano or an optionally halogenated alkyl or alkoxy group with 1 to 12 C atoms, optionally substituted by a terminal polymerizable group, and $L^1$ and $L^2$ are each independently H, F, Cl, CN, or an optionally halogenated alkyl, alkoxy or alkanoyl group with 1 to 7 C atoms.

The polymerizable mesogenic compounds of V1–V7 can be prepared by methods which are known per se and which are described in standard works of organic chemistry such as, for example, Houben-Weyl, Methoden der organischen Chemie, Thieme-Verlag, Stuttgart. Further methods of their preparation can be taken for example from the above cited WO 93/22397; EP 0 261 712 or DE 195,04,224.

Particularly preferred are polymerizable mixtures comprising at least two reactive mesogenic compounds at least one of which is a compound of formula V1–V7.

In another preferred embodiment of the present invention the polymerizable mesogenic mixture comprises a1) 5 to 60%, very preferably 5 to 40% by weight of up to five, preferably one, two or three monofunctional polymerizable mesogenic compounds having an unpolar terminal alkyl or alkoxy group, a2) 5 to 40%, very preferably 5 to 30% by weight of one, two or three monofunctional polymerizable mesogenic compounds having a polar terminal group, preferably a CN, halogen or halogenated alkyl or alkoxy group, b) 20 to 95%, very preferably 30 to 85% by weight of a bifunctional polymerizable mesogenic compound, c) 0.5 to 10%, very preferably 1 to 7% by weight of a photoinitiator, d) 0.05 to 5%, very preferably 0.1 to 2% by weight of a surfactant, preferably a nonionic surfactant.

Polymerization of the polymerizable mesogenic material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. Another possible source for actinic radiation is a laser, like e.g. a UV laser, an IR laser or a visible laser.

For mass production short curing times of 3 minutes or less, very preferably of 1 minute or less, in particular of 30 seconds or less, are preferred.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable mesogenic material preferably comprises 0.01 to 10%, very preferably 0.05 to 5%, in particular 0.1 to 3% of a polymerization initiator. UV photoinitiators are preferred, in particular radicalic UV photoinitiators.

In some cases a second substrate is used that does not only aid alignment of the polymerizable composition, but also excludes oxygen that may inhibit the polymerization. Alternatively the curing can be carried out under an atmosphere of inert gas. However, curing in air is also possible using suitable photoinitiators and high lamp power. When using a cationic photoinitiator oxygen exclusion most often is not needed, but water should be excluded.

In a preferred embodiment of the invention the polymerization of the polymerizable mesogenic material is carried out under an atmosphere of inert gas, preferably under a nitrogen atmosphere.

In addition to the polymerization initiators mentioned above, the polymerizable material may also comprise one or more other suitable components such as, for example, catalysts, stabilizers, chain-transfer agents, co-reacting monomers or surface-active compounds. In particular the addition of stabilizers is preferred in order to prevent undesired spontaneous polymerization of the polymerizable material for example during storage.

As mentioned above, it is possible to add one or more surfactants to the polymerizable mesogenic material in order to induce planar alignment, i.e. an orientation wherein the mesogens are aligned substantially parallel to the plane of the layer, with a low tilt angle relative to the plane of the layer.

Suitable surfactants are described for example in J. Cognard, Mol.Cryst.Liq.Cryst. 78, Supplement 1, 1–77 (1981). Particularly preferred are non-ionic surfactants, such as mixtures of non-ionic fluoroalkylalkoxylate surfactants selected from formula III and IV $$C_nF_{2n+1}SO_2N(C_2H_5)(CH_2CH_2O)_xCH_3 \qquad \text{III}$$

$$C_nF_{2n+1}(CH_2CH_2O)_xH \qquad \text{IV}$$

wherein n is an integer from 4 to 12 and x is an integer from 5 to 15. Upon using these surfactants it is possible to produce polymerized films with a very low tilt angle.

The surfactants of formula III are commercially available under the trade name Fluorad 171 (from 3M Co.), the surfactants of formula IV under the trade name Zonyl FSN (from DuPont).

Polymerizable mesogenic mixtures according to this preferred embodiment contain preferably from 500 to 2500 ppm, in particular from 1000 to 2500 ppm, very preferably from 1500 to 2500 ppm of surfactants.

It is also possible, in order to increase crosslinking of the polymers, to add up to 20% of a non mesogenic compound with two or more polymerizable functional groups to the polymerizable mixture alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the polymerizable mixture comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the inventive optical retardation film.

To obtain polymerized films with the desired molecular orientation the polymerization has to be carried out in the liquid crystal phase of the polymerizable mesogenic mixture. Therefore, preferably polymerizable mesogenic compounds or mixtures with low melting points and broad liquid crystal phase ranges are used. The use of such materials allows to reduce the polymerization temperature, which makes the polymerization process easier and is a considerable advantage especially for mass production.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

Polymerization temperatures below 120° C. are preferred. Especially preferred are temperatures below 90° C., in particular temperatures of 60° C. or less.

The retardation value of optical retardation films like those obtained by the inventive process is depending inter alia on the type of liquid crystal materials used and on the thickness of the polymer film. As a role of thumb, when using a liquid crystal material with a birefringence of about 0.15, an increase in optical retardation of 100 nm requires an increase in layer thickness of about 1 $\mu$m.

The retardation of the inventive optical retardation films is preferably ranging from about 20 to about 700 nm. The layer thickness of the optical retardation film is preferably from 1 to 30 $\mu$m, in particular from 1 to 15 $\mu$m, very preferably from 1 to 7 $\mu$m.

An optical retardation film prepared from the inventive process can be used in liquid crystal displays as quarter wave retardation film, like for example described in the cited prior art document WO 98/04651-A, or as a compensation film, like for example disclosed in the WO 98/12584-A.

Preferably, an inventive optical retardation film is used in combination together with a broadband reflective polarizer as disclosed in the WO 97/35219 and/or a conventional linear polarizer.

A preferred embodiment of the present invention relates to an optical retardation film which is obtained by the inventive process and exhibits at least one layer of an anisotropic polymer with a major optical axis substantially parallel to the plane of the layer.

Films thus obtained and having an optical retardation from 90 to 180 nm are typically used as a quarter wave retardation film as suggested e.g. in the WO 98/04651-A, whereas films thus obtained with an optical retardation from 400 to 700 nm are typically used as a compensation film e.g. for STN displays.

Another preferred embodiment of the present invention relates to an optical retardation film which is obtained by the inventive process and exhibits at least one layer of an anisotropic polymer with a major optical axis that is tilted at an angle $\alpha_o$ of between 0 and 90 degrees relative to the plane of the layer.

For applications e.g. in TN displays sometimes films with a tilt angle that is substantially zero and a value of the optical retardation as low as 20 nm are used. For most TN applications, however, an optical film exhibiting a splayed structure, i.e. wherein the major optical axis exhibits a tilt angle $\alpha_o$ between 0 and 90 degrees that varies in a direction normal to the film plane, and having a retardation from 40 to 100 nm at normal incidence is preferred.

Yet another preferred embodiment of the present relates to an optical retardation film which is obtained by the inventive process and exhibits at least one layer of an anisotropic polymer, wherein the major optical axis is either parallel or tilted at an angle $\alpha_o$ of between 0 and 90 degrees relative to the plane of the layer, and the optical axis is additionally being inclined at an angle $\theta_{LC}$ of between 0 and 90 degrees relative to the long side of the film.

Such an optical retardation film can be obtained on a substrate that has been rubbed according to the inventive method, with the rub angle $\theta$ being different from 0 degrees, and the angle of inclination $\theta_{LC}$ of the optical axis being approximately identical to the effective rub angle $\theta_{eff}$. It can be used as a compensation film as suggested e.g. in the WO 98/12584-A.

The entire disclosure of all applications, patents and publications, cited above and below, and of corresponding European Application No. 98114389.4, filed Jul. 31, 1998 is hereby incorporated by reference.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, all temperatures are set forth uncorrected in degrees Celsius and unless otherwise indicated, all parts and percentages are by weight. The following abbreviations are used to illustrate the liquid crystalline phase behaviour of the compounds:

K=crystalline; N=nematic; S=smectic; Ch=cholesteric; I=isotropic. The numbers between these symbols indicate the phase transition temperatures in degree Celsius.

EXAMPLES

Example 1

The following polymerizable liquid crystalline mixture was formulated according to standard procedures

| | |
|---|---|
| compound(1) | 18.7% |
| compound(2) | 37.6% |
| compound(3) | 37.6% |
| Irgacure 907 | 5.6% |
| FC 171 | 0.5% |

(1)

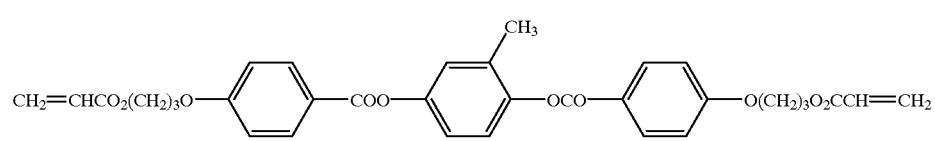

(2)

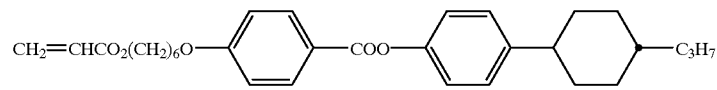

-continued

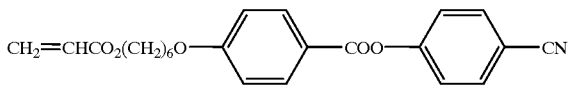

(3)

The compounds (1) to (3) can be prepared according to or in analogy to the methods described in D. J. Broer et al., Makromol.Chem. 190, 3201–3215 (1989) and in the WO 97/34862. Irgacure 907 is a radicalic photoinitiator (available from Ciba Geigy). FC 171 is a non-ionic fluorocarbon surfactant (from 3M Corp.).

The mixture was dissolved in a concentration of 21% by weight in toluene. The solution was filtered to remove impurities and small particles.

Use Example 1A

Several individual samples of a long TAC web of 20 cm width (TAC 95, 80 μm thick), were rubbed in a rubbing apparatus as depicted in FIG. 3, whilst being wound from roll to roll, with the diameter of both the rubbing and compensation roller being 72 mm and the rub angle θ being 10 degrees. Both the rubbing and compensation roller were covered with a standard type velvet cloth.

The individual rubbing conditions for each sample, including rub angle θ, roller speed $v_{rol}$, web speed $v_l$, wrap angle φ and the rub length I thus determined, are given in Table 1A. From these values the effective rub angle $θ_{eff}$ and the rub length I were calculated as described above.

TABLE 1A

| Sample No. | A1 | A2 | A3 | A4 | A5 |
|---|---|---|---|---|---|
| θ (degrees) | 10 | 10 | 10 | 10 | 10 |
| $v_{rol}$ (rpm) | 185 | 370 | 92 | 370 | 740 |
| $v_l$ (m/min) | 5 | 9 | 2.5 | 5 | 5 |
| φ (degrees) | 45 | 45 | 45 | 45 | 22.5 |
| l (mm) | 262 | 288 | 262 | 496 | 482 |
| $θ_{eff}$ (degrees) | 9 | 9 | 9 | 9 | 10 |
| $θ_{LC}$ (degrees) | 6 | 6 | 7 | 7 | 8.5 |

The solution of the polymerizable mesogenic mixture from example 1 was coated by means of a doctor blade as a thin layer with a thickness of approximately 12 μm onto the individual samples of rubbed TAC web. The solvent was allowed to evaporate at 55° C. The remaining approximately 1–2 μm thick layer of the polymerizable liquid crystalline mixture was then cured in its nematic phase in air at ambient temperature by irradiating with UV light from a mercury lamp for a few seconds.

In this way, different samples of a liquid crystal polymer film with uniform molecular orientation were obtained that can be used as optical retardation films. The mesogens in the polymerized liquid crystal material exhibit planar alignment, with the orientation direction of the mesogenic groups being inclined at an angle $θ_{LC}$ to the long side of the web.

The angle of inclination $θ_{LC}$ of the mesogenic groups in the individual samples of liquid crystal polymer film relative to the film plane was measured using a protractor and a ruler, viewing the film between crossed polarizers. The angle $θ_{LC}$ was measured relative to the straight edge of the substrate which is corresponding to the long side of the long TAC web in the rubbing process. The measured angle $θ_{LC}$ was compared with the calculated effective rub angle $θ_{eff}$ of the web, as shown in Table 1A above.

The results depicted in Table 1A above show that there is a good correlation between the measured inclination angle $θ_{LC}$ and the predicted effective rub angle $θ_{eff}$, wherein the absolute difference $|θ_{eff}-θ_{LC}|$ is within the experimental accuracy of the measurement of $θ_{LC}$.

Use Example 1B

Several individual samples of the long film TAC web of use example 1A were rubbed as described in use example 1A, with the rub angle θ being 25 degrees and the other rubbing parameters being as shown in Table 1B.

TABLE 1B

| Sample No. | B1 | B2 | B3 | B4 |
|---|---|---|---|---|
| θ (degrees) | 25 | 25 | 25 | 25 |
| $v_{rol}$ (rpm) | 185 | 370 | 370 | 740 |
| $v_l$ (m/min) | 5 | 9 | 5 | 5 |
| φ (degrees) | 45 | 45 | 45 | 22.5 |
| l (mm) | 260 | 286 | 494 | 481 |
| $θ_{eff}$ (degrees) | 22 | 23 | 24 | 24 |
| $θ_{LC}$ (degrees) | 20 | 25 | 27 | 26.5 |

The solution of the polymerizable mesogenic mixture from example 1 was coated onto the individual samples of the thus rubbed TAC web and the mixture was cured as described in use example 1A. In the liquid crystal polymer films thus obtained, the inclination angle $θ_{LC}$ of the mesogenic groups was measured and compared with the calculated effective rub angle $θ_{eff}$ of the TAC web, as shown in Table 1B above.

The results depicted in Table 1B above show that there is a good correlation between the measured inclination angle $θ_{LC}$ and the predicted effective rub angle $θ_{eff}$, wherein the absolute difference $|θ_{eff}-θ_{LC}|$ is within the experimental accuracy of measuring $θ_{LC}$.

Use Example 1C

Several individual samples of the long film TAC web of use example 1A were rubbed as described in use example 1A, with the rub angle θ being 35 degrees and the other rubbing parameters being as shown in Table 1C.

TABLE 1C

| Sample No. | C1 | C2 | C3 | C4 | C5 |
|---|---|---|---|---|---|
| θ (degrees) | 35 | 35 | 35 | 35 | 35 |
| $v_{rol}$ (rpm) | 740 | 370 | 180 | 999 | 200 |
| $v_l$ (m/min) | 5 | 9 | 5 | 5 | 5 |
| φ (degrees) | 22.5 | 45 | 45 | 10 | 10 |
| l (mm) | 480 | 284 | 251 | 276 | 59 |
| $θ_{eff}$ (degrees) | 34 | 32 | 31 | 34 | 32 |
| $θ_{LC}$ (degrees) | 33 | 29 | 35 | 32 | 34 |

The solution of the polymerizable mesogenic mixture from example 1 was coated onto the individual samples of the thus rubbed TAC web and the mixture was cured as described in use example 1A. In the liquid crystal polymer films thus obtained, the inclination angle $θ_{LC}$ of the mesogenic groups was measured and compared with the calculated effective rub angle $\theta_{\it eff}$ of the TAC web, as shown in Table 1C above.

The results depicted in Table 1C above show that there is a good correlation between the measured inclination angle $\theta_{LC}$ and the predicted effective rub angle $\theta_{\it eff}$, wherein the absolute difference $|\theta_{\it eff}-\theta_{LC}|$ is within the experimental accuracy of measuring $\theta_{LC}$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing an optical retardation film comprising at least one layer of an anisotropic polymer material, wherein the process comprises:
   A) rubbing a continuously moving substrate with at least one rubbing roller,
   B) coating a layer of a polymerizable mesogenic material, a liquid crystal polymer or a liquid crystal oligomer onto the rubbed surface of said substrate,
   C) polymerizing and/or crosslinking the coated material obtained in B) by exposure to heat or actinic radiation,
   D) optionally repeating B) and C) one or more times, and
   E) optionally removing the polymer film from the substrate.

2. A process for preparing an optical retardation film comprising at least one layer of an anisotropic polymer material, wherein the process comprises:
   A) rubbing a continuously moving substrate with at least one rubbing roller, wherein rubbing of the substrate is carried out by continuously moving a substrate (10) into the direction (13;13*) between at least two rollers (11) and (12), at least one of which is giving rubbing treatment to the substrate, wherein
      a) said at least two rollers (11) and (12) are located on opposite sides of the substrate (10),
      b) said at least two rollers (11) and (12) are rotating against the moving direction (13;13*) of the substrate (10),
      c) said at least one of said two rollers (11) and (12) giving rubbing treatment to the substrate (10) is located such that its rotation axis (14) and the moving direction (13) of the substrate form a rub angle θ that can be varied within the range from 0 to less than 90 degrees,
      d) said at least one of said at least two rollers (11) and (12) giving rubbing treatment to the substrate (10) is located such that the substrate is wrapped at least partially around the roller at a wrap angle φ that can be varied within the range from 0 to at least 270 degrees; with said wrap angle φ being defined as the angle of the circular segment of the cross section of the roller that is in contact with the moving substrate (10)
   B) coating a layer of a polymerizable mesogenic material, a liquid crystal polymer or a liquid crystal oligomer onto the rubbed surface of said substrate,
   C) optionally polymerizing and/or crosslinking the coated material obtained in B) by exposure to heat or actinic radiation,
   D) optionally repeating B) and C) one or more times, and
   E) optionally removing the polymer film from the substrate.

3. The process according to claim 2, wherein said wrap angle φ is from larger than 0 to 180 degrees.

4. The process according to claim 2, wherein said rub angle θ is from larger than 0 to 60 degrees.

5. The process according to claim 2, wherein at least one of said at least two rollers (11) and (12) giving rubbing treatment to the substrate (10) is covered with a rubbing cloth.

6. The process according to claim 1, wherein the substrate is coated with a layer of polymerizable mesogenic material comprising at least one polymerizable mesogenic compound having at least one polymerizable group.

7. An optical retardation film prepared by the process of claim 1.

8. The optical retardation film according to claim 7, which exhibits at least one layer of an anisotropic polymer with a major optical axis substantially parallel to the plane of the layer.

9. The optical retardation film according to claim 7, wherein the optical retardation film exhibits at least one layer of an anisotropic polymer with a major optical axis that is tilted at an angle $\alpha_o$ of between 0 and 90 degrees relative to the plane of the layer.

10. The optical retardation film according to claim 7, which has its major optical axis inclined in an angle $\theta_{LC}$ of between 0 and 90 degrees relative to the long side of the film.

11. A liquid crystal display device comprising a liquid crystal cell and at least one optical retardation film according to claim 7.

12. An apparatus for rubbing a substrate (10), comprising at least two rollers (11) and (12), at least one of which is giving rubbing treatment to the substrate (10) that is continuously moving in the direction (13;13*) between said at least two rollers (11;12), and optionally comprising one or more guide rollers (16;17), wherein
   a) said at least two rollers (11) and (12) are located on opposite sides of the substrate (10),
   b) said at least two rollers (11) and (12) are rotating against the moving direction (13;13*) of the substrate (10),
   c) said at least one of said two rollers (11) and (12) giving rubbing treatment to the substrate (10) is located such that its rotation axis (14) and the moving direction (13) of the substrate form a rub angle θ that can be varied within the range from 0 to less than 90 degrees,
   d) said at least one of said at least two rollers (11) and (12) giving rubbing treatment to the substrate (10) is located such that the substrate is wrapped at least partially around the roller at a wrap angle φ that can be varied within the range from 0 to at least 270 degrees; with said wrap angle φ being defined as the angle of the circular segment of the cross section of the roller that is in contact with the moving substrate (10).

13. The apparatus according to claim 12, wherein the rotation axes (14;15) of said at least two rollers (11;12) are connected by at least one linking element (22), wherein the rollers (11;12) can be turned around an axis (23) parallel to their rotation axes (14;15).

14. The apparatus according to claim 12, wherein said at least two rollers (11) and (12) form a rotatable unit (25) that further comprises a driving means (26) comprising one or more motors and optionally gears giving rotation speed of equal absolute value and opposite sense to the rollers (11;12), wherein said unit (25) is rotatable around an axis (27) that is perpendicular to the plane defined (25) is rotatable around an axis (27) that is perpendicular to the plane defined by rollers (16) and (17) and around an axis (28) that is parallel to the rotation axes (14;15) of the rollers (11;12).

15. The apparatus according to claim 12 which further comprises one or more vacuum beds (30;31) over which the substrate (10) is moved before and/or after being rubbed.

16. The apparatus according to claim 12 characterized in that it comprises at least three rollers (11;12;32) giving rubbing treatment to the substrate (10), at least two of which are located on opposite sides of the substrate (10).

17. A process for preparing an optical retardation film comprising at least one layer of an anisotropic polymer material, wherein the process comprises:

A) rubbing a continuously moving substrate with at least one rubbing roller wherein the substrate is a flexible film substrate, B) coating a layer of a polymerizable mesogenic material, a liquid crystal polymer or a liquid crystal oligomer onto the rubbed surface of said substrate, C) optionally polymerizing and/or crosslinking the coated material obtained in B) by exposure to heat or actinic radiation, D) optionally repeating B) and C) one or more times, and E) optionally removing the polymer film from the substrate.

18. A method for rubbing a substrate which comprises rubbing the substrate with an apparatus according to claim 12.

19. The method of claim 18, wherein the wrap angle, $\phi$, is from larger than 0 to 180 degrees.

20. The method of claim 18, wherein the wrap angle, $\phi$, is from larger than 0 to 120 degrees.

21. The method of claim 18, wherein the wrap angle, $\phi$, is from larger than 0 to 60 degrees.

22. The method of claim 18, wherein the wrap angle, $\phi$, is from 3 to 45 degrees.

23. An optical retardation film prepared by the process of claim 2.

24. An optical retardation film prepared by the process of claim 17.

* * * * *